US008484346B2

(12) United States Patent
Lipscomb et al.

(10) Patent No.: US 8,484,346 B2
(45) Date of Patent: *Jul. 9, 2013

(54) SIMULTANEOUS MAINTENANCE OF MULTIPLE VERSIONS OF A WEB-BASED BUSINESS INFORMATION SYSTEM

(75) Inventors: David Lipscomb, Sunnyvale, CA (US); Christopher T. Blum, Belmont, CA (US); Theodore R. Rice, Boulder, CO (US)

(73) Assignee: Netsuite Inc., San Mateo, CA (US)

(\*) Notice: Subject to any disclaimer, the term of this patent is extended or adjusted under 35 U.S.C. 154(b) by 71 days.

This patent is subject to a terminal disclaimer.

(21) Appl. No.: 13/155,265

(22) Filed: Jun. 7, 2011

(65) Prior Publication Data

US 2011/0307458 A1    Dec. 15, 2011

Related U.S. Application Data

(60) Continuation of application No. 12/478,590, filed on Jun. 4, 2009, now Pat. No. 7,970,901, which is a division of application No. 10/890,347, filed on Jul. 12, 2004, now Pat. No. 7,558,843.

(51) Int. Cl.
 *G06F 15/173* (2006.01)
(52) U.S. Cl.
 USPC .............. 709/225; 709/219; 717/170
(58) Field of Classification Search
 USPC ............ 709/217, 219, 225; 707/170; 717/170
 See application file for complete search history.

(56) References Cited

U.S. PATENT DOCUMENTS

| 5,832,496 A | 11/1998 | Anand et al. |
| 5,842,193 A | 11/1998 | Reilly |
| 5,878,230 A | 3/1999 | Weber |
| 5,926,806 A | 7/1999 | Marshall et al. |

(Continued)

FOREIGN PATENT DOCUMENTS

WO        01/09745        8/2001

OTHER PUBLICATIONS

Babcock, Charles, "Isomorphic Broadens Rich Web Client Appeal," The Foggy Mountain Report, No. 19, San Francisco, CA, published at www.charlesbabcock.com, (Jan. 8, 2003).

(Continued)

*Primary Examiner* — David Lazaro
*Assistant Examiner* — Marie Georges Henry
(74) *Attorney, Agent, or Firm* — Lane Powell, PC (57) ABSTRACT

A method, system, computer program product, and related business methods for phased rollout of an upgraded version of a web-based business information system are described. URLs associated with client requests remain the same even where the target subscriber accounts have been upgraded. Client requests for both upgraded and non-upgraded accounts are received by a common set of web servers. Client requests representing external entry points are trapped, and the receiving web server accesses a login router database to determine whether the target subscriber account is upgraded or non-upgraded, and then transfers the request to an appropriately-versioned application server. Application server sets are mapped to database sets according to system version, allowing the upgraded system database schema to be substantially different than the non-upgraded database schema. An early adopter program business method leveraging the abilities of such web-based business information system is also described. Applications to environments other than phased rollout are described, such as URL-agnostic differentiation and routing of client requests according to class-of-service of the target subscribing account.

19 Claims, 8 Drawing Sheets

U.S. PATENT DOCUMENTS

| | | | |
|---|---|---|---|
| 6,025,841 | A | 2/2000 | Finkelstein et al. |
| 6,170,002 | B1 | 1/2001 | Ouchi |
| 6,208,717 | B1 | 3/2001 | Yeh et al. |
| 6,317,786 | B1 | 11/2001 | Yamane et al. |
| 6,359,976 | B1 | 3/2002 | Kalyanpur et al. |
| 6,385,641 | B1 | 5/2002 | Jiang et al. |
| 6,438,545 | B1 | 8/2002 | Beauregard et al. |
| 6,510,439 | B1 | 1/2003 | Rangarajan et al. |
| 6,591,291 | B1 | 7/2003 | Gabber et al. |
| 6,611,839 | B1 | 8/2003 | Nwabueze |
| 6,622,159 | B1 | 9/2003 | Chao et al. |
| 6,640,249 | B1 | 10/2003 | Bowman-Amuah |
| 6,641,037 | B2 | 11/2003 | Williams |
| 6,643,684 | B1 | 11/2003 | Malkin |
| 6,701,378 | B1 | 3/2004 | Gilhuly |
| 6,784,901 | B1 | 8/2004 | Harvey et al. |
| 6,785,710 | B2 | 8/2004 | Kikinis |
| 6,785,718 | B2 | 8/2004 | Hancock et al. |
| 6,839,702 | B1 | 1/2005 | Patel et al. |
| 6,856,942 | B2 | 2/2005 | Garnett et al. |
| 6,865,268 | B1 | 3/2005 | Matthews et al. |
| 6,871,214 | B2 | 3/2005 | Parsons et al. |
| 6,999,959 | B1 | 2/2006 | Lawrence et al. |
| 7,007,018 | B1 | 2/2006 | Kirkwood et al. |
| 7,032,030 | B1 | 4/2006 | Codignotto |
| 7,054,906 | B2 | 5/2006 | Levosky |
| 7,072,913 | B2 * | 7/2006 | Jans et al. ............................. 1/1 |
| 7,231,427 | B1 | 6/2007 | Du |
| 7,240,280 | B2 | 7/2007 | Jolley et al. |
| 7,380,003 | B1 | 5/2008 | Guo et al. |
| 7,412,437 | B2 | 8/2008 | Moody et al. |
| 7,461,077 | B1 | 12/2008 | Greenwood |
| 7,472,342 | B2 | 12/2008 | Haut et al. |
| 7,496,687 | B2 | 2/2009 | Griffin et al. |
| 7,685,010 | B2 | 3/2010 | Goldberg et al. |
| 7,685,515 | B2 | 3/2010 | Braud et al. |
| 7,953,800 | B2 | 5/2011 | Fabre et al. |
| 2001/0025305 | A1 | 9/2001 | Yoshiasa |
| 2001/0034771 | A1 | 10/2001 | Hutsch et al. |
| 2002/0046250 | A1 | 4/2002 | Nassiri |
| 2002/0069204 | A1 | 6/2002 | Kahn et al. |
| 2002/0120581 | A1 | 8/2002 | Schiavone |
| 2002/0120600 | A1 | 8/2002 | Schiavone |
| 2002/0120748 | A1 | 8/2002 | Schiavone et al. |
| 2002/0123957 | A1 | 9/2002 | Notarius et al. |
| 2002/0152399 | A1 | 10/2002 | Smith |
| 2002/0169797 | A1 | 11/2002 | Hegde et al. |
| 2002/0188486 | A1 | 12/2002 | Gil et al. |
| 2002/0188513 | A1 | 12/2002 | Gil et al. |
| 2002/0198800 | A1 | 12/2002 | Shamrakov |
| 2003/0001885 | A1 | 1/2003 | Lin et al. |
| 2003/0033179 | A1 | 2/2003 | Katz et al. |
| 2003/0061482 | A1 | 3/2003 | Emmerichs |
| 2003/0093443 | A1 * | 5/2003 | Huxoll ........................... 707/204 |
| 2003/0093496 | A1 | 5/2003 | O'Connor et al. |
| 2003/0101065 | A1 | 5/2003 | Rohall et al. |
| 2003/0144903 | A1 | 7/2003 | Brechner et al. |
| 2003/0158975 | A1 | 8/2003 | Frank et al. |
| 2003/0163537 | A1 | 8/2003 | Rohall et al. |
| 2003/0167315 | A1 | 9/2003 | Chowdhry et al. |
| 2004/0006598 | A1 | 1/2004 | Bargagli Damm et al. |
| 2004/0044703 | A1 | 3/2004 | Wildhagen et al. |
| 2004/0049571 | A1 | 3/2004 | Johnson et al. |
| 2004/0083271 | A1 | 4/2004 | Tosey |
| 2004/0122943 | A1 | 6/2004 | Error et al. |
| 2004/0133810 | A1 | 7/2004 | Brischke et al. |
| 2004/0172537 | A1 | 9/2004 | Baus et al. |
| 2004/0186738 | A1 | 9/2004 | Reisman |
| 2004/0193651 | A1 | 9/2004 | McLauglin |
| 2004/0199541 | A1 | 10/2004 | Goldberg et al. |
| 2004/0199543 | A1 | 10/2004 | Braud et al. |
| 2005/0004990 | A1 | 1/2005 | Durazo et al. |
| 2005/0012965 | A1 | 1/2005 | Bloomfield |
| 2005/0050007 | A1 | 3/2005 | Sampson |
| 2005/0055442 | A1 | 3/2005 | Reeves et al. |
| 2005/0091320 | A1 | 4/2005 | Kirsch et al. |
| 2006/0010214 | A1 | 1/2006 | McDowell et al. |
| 2007/0005762 | A1 | 1/2007 | Knox et al. |
| 2007/0043817 | A1 | 2/2007 | Oliver et al. |

OTHER PUBLICATIONS

CIO.com, "Executive Summaries: Enterprise Resource Planning," CXO Media, Inc. (Aug. 22, 2002), as printed on Mar. 27, 2003 from http://www.cio.com/summaries/enterorise/ero/index.html.

"Netledger 1 Day Test Drive Login" NetLedger, retrieved from internet from: <testdrive.netledgercom> archived Apr. 22, 2001.

Dragan, Richard V., "CRM Goes Mainstream," PC Magazine, New York, vol. 20, Iss. 11, p. 28 (Jun. 12, 2001).

Goodman, D., JavaScript Bible: Gold Edition, Hungry Minds, Inc. (2001). (cover page and table of contents only).

Isomorphic Software, "Isomorphic SmartClient (ISC) Historical/Competitive Brief," Isomorphic Software, Inc., San Francisco, CA (Jun. 12, 2003).

Isomorphic Software, "Isomorphic SmartClient (ISC) Technology Brief," Isomorphic Software, Inc., San Francisco, CA (Jun. 10, 2003).

"NetLedger Launches NetSuite, the First Online Suite That Combines ERP and CRM Functionality Aimed at Companies With Fewer Than 500 Employees," Internet retailer. Retrieved from internet <http://www.internetretailercom/internet/marketing-conference/5666787-28-netledger-launches-netsuitetm.html> (Oct. 15, 2002).

Novotny, Jason, et al., "GridLab Portal Design," Downloaded from http://www.gridlab.org/WorkPackages/wp-4/Documents/GridSphere.pdf, 2001, pp. Cover, 1-43.

Patricia Seybold Group, "An Executive's Guide to CRM: How to Evaluate CRM Alternatives by Functionality, Architecture, & Analytics" (2002), as printed on Mar. 27, 2003 from http://www.psgroup.com/freereport/imedia/CRM-EXECGUIDE3-02.pdf.

Ray, D. and Ray, E., Mastering HTML and XHTML, Sybex, Inc. (2002) (cover page and table of contents only).

Resnick, P., Ed., "Request for Comments 2822 (RFC 2822), Internet Message Format," Internet Engineering Task Force (Apr. 2001).

Wilson, Ralph F., "A Simply Way to Format HTML E-Mail Newsletters." Jan. 1, 2000, Web Marketing Today, Issue 67.

* cited by examiner

SIMULTANEOUS MAINTENANCE OF MULTIPLE VERSIONS OF A WEB-BASED BUSINESS INFORMATION SYSTEM

CROSS-REFERENCES TO RELATED APPLICATIONS

This application is a continuation of U.S. patent application Ser. No. 12/478,590, filed Jun. 4, 2009, now U.S. Pat. No. 7,970,901 titled "PHASED ROLLOUT OF VERSION UPGRADES IN WEB-BASED BUSINESS INFORMATION SYSTEMS" and having the contents of which are hereby incorporated in their entirety by reference.

FIELD

This patent specification relates to web-based business applications. More particularly, this patent specification relates to a method, system, computer program product, and related business methods for upgrading a web-based business information system using a phased rollout approach.

BACKGROUND

The ability of business users to manage crucial business information has been greatly enhanced by the proliferation of IP-based networking together with advances in object oriented Web-based programming and browser technology. Using these advancements, systems have been developed that permit web-based access to business information systems, thereby allowing any user with a browser and an Internet or intranet connection to view, enter, or modify the required business information.

As such systems grow increasingly sophisticated, problems can arise in rolling out newer, more advanced system versions in a manner that meets the many different demands placed on the system provider. For example, it is desirable to allow advanced users to access the features and advantages of the new version of the system as soon as they are ready. At the same time, it is desirable to avoid thrusting the new version upon users of the current version who may not be ready for the new features. It is desirable to minimize the number of client-side system changes (e.g., bookmarks, macros, scripts) required by the upgrading customers to properly gain access to new version. Likewise, it is desirable to minimize any client-side system changes needed for non-upgrading customers to properly maintain access to the current version. Finally, in a web-based access environment, it is mandatory to properly manage the loading of web servers, application servers, and databases over a variety of traffic conditions to maintain full system availability for substantially all users at substantially all times.

As used herein, the term web-based business application or web-based business information system generally refers to a business software system having browser-based access such that an end user, or client, requires only a browser and an Internet/intranet connection on their desktop, laptop, network appliance, PDA, etc., to obtain substantially complete access to that system. Many web-based business information systems, including those described infra with respect to the preferred embodiments, also accommodate so-called server-to-server communications in which automated systems, rather than humans, are the requesting clients. Commonly, the web-based business information systems sends information to the automated client, and/or receives information from the automated client, using HTTP or HTTPS over TCP/IP, with the data itself being presented according to a markup language such as XML or variants thereof such as qbXML or smbXML.

Examples of web-based business applications include those described in the following commonly assigned patent applications, each of which is incorporated by reference herein: U.S. Ser. Nos. 10/406,915, 10/665,308, and 10/796,718 (hereinafter the "incorporated disclosures"). Further examples of web-based business applications include application service provider (ASP) hosted services provided by NetSuite, Inc. of San Mateo, Calif. such as NetSuite™, Net-CRM™, NetERP™, NetSuite Small Business™, and NetCommerce™. A further example of a web-based business application is discussed in the literature referencing the web-based business application maintained by Salesforce.Com, Inc. of San Francisco, Calif.

Web-based business applications can also be implemented using non-ASP models having different hosting mechanisms, such as with self-hosted systems in which a business enterprise operates and maintains its own private, captive business information system having browser-based access across an intranet and/or the Internet. As described in the incorporated disclosures, a commercial enterprise can achieve many functional and strategic advantages by using a web-based business information system comprising integrated ERP (Enterprise Resource Planning), CRM (Customer Relationship Management), and other business capabilities.

Figure 1:
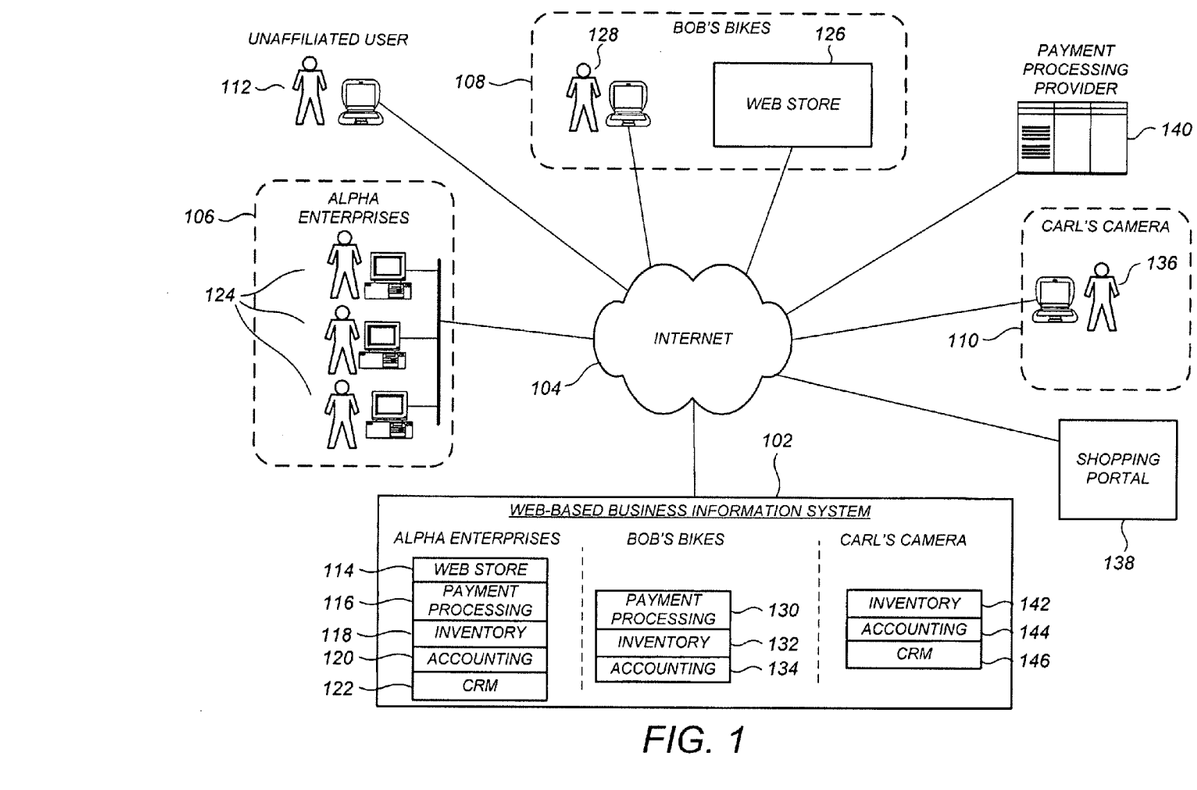
FIG. 1 illustrates a web-based business information system environment.

FIG. 1 illustrates a web-based business information system environment for which one or more of the preferred embodiments described infra are particularly advantageous. It is to be appreciated that FIG. 1 is presented by way of example and not by way of limitation, in order to clearly set forth the features and advantages of the preferred embodiments described infra. Web-based business information system 102 is coupled via the Internet 104 to a plurality of customer companies 106 (Alpha Enterprises), 108 (Bob's Bikes), and 110 (Carl's Camera). Each customer company 106, 108, and 110 has a distinct account with the provider of the web-based business information system 102, as identified by a unique account identifier. The web-based business information system 102 is responsible for maintaining business data associated with each account in accordance with the services to which that account is subscribed. As used herein, the term account refers to the subscribing business entity (e.g., Alpha Enterprises, Bob's Bikes, Carl's Camera) and/or to the datasets within the web-based business information system corresponding to that subscribing business entity.

Also shown in FIG. 1 are a plurality of end users 124, 128, and 136, each end user being associated with at least one account within the web-based business information system 102. Each end user has a unique identity with respect to the web-based business information system 102 and is identified by a unique end user identifier, such as an e-mail address or social security number. As described in Ser. No. 10/406,915, supra, each end user has at least one role (e.g., Salesperson, Executive, Administrator) with respect to at least one account in the web-based business information system 102. Notably, the same end user can potentially have multiple roles across multiple customer accounts of the web-based business information system 102. However, end users can only have a single role at any particular time during any particular session with the web-based business information system 102. When accessing the web-based business information system 102 in the context of a particular role, the end users 124, 128, and 136 represent a first type of requesting client to the web-based business information system.

Also shown in FIG. 1 is an unaffiliated user 112 who generally has no particular relationship with the provider of the web-based business information system 102, but whose sessions with the web-based business information system 102 are often highly desirable. The unaffiliated user 112 can be a web shopper who is visiting a web store hosted by the web-based business information system 102 on behalf of Alpha Enterprises, for example. The web shopper may have been directed to Alpha Enterprises' hosted web store by entering a URL, by clicking a link in a targeted e-mail advertisement, by clicking a link in a search result, or by any of a variety of other methods. As another example, unaffiliated user 112 can be a potential business contact who entered a URL printed on a business card of one of the end users 124, 128, or 136. In such case, the potential business contact is directed to a page within the web-based business information system 102 where he or she can enter their contact information. Unaffiliated users represent a second type of requesting client with respect to the web-based business information system 102. Notably, end users 124, 128, or 136 may themselves be unaffiliated users with respect to some sessions with the web-based business information system 102, e.g., when they are using their browser to shop online during non-work hours or the like. For simplicity and clarity of description, in the case of end users, unaffiliated users, or other humans using a browser to access the web-based business information system 102, the term requesting client can refer to that user and/or to their browser software.

In the example of FIG. 1, Alpha Enterprises subscribes to a full slate of features offered by the web-based business information system 102, including web store hosting, payment processing, inventory control, accounting, and CRM (customer relationship management), with corresponding data being respectively stored at locations 114-122 therein. Bob's Bikes hosts its own web store 126, but subscribes to the web-based business information system 102 for payment processing, inventory control, and accounting, with corresponding data being respectively stored at locations 130-134 therein. Finally, Carl's Camera has a web store that is hosted by a third party shopping portal 138, but uses a third party payment processor 140 to process the credit card transactions associated with that web store. However, Carl's Camera subscribes to the web-based business information system 102 for the purposes of inventory control, accounting, and CRM, with corresponding data being respectively stored at locations 142-146 therein.

External business systems such as the web store 126, shopping portal 138, and the payment processing provider 140 of FIG. 1 are usually outside the control of the provider of the web-based business information system 102. However, these external business systems usually require automated communications with the web-based business information system 102 for proper updating of the data for which the web-based business information system is responsible. For example, automated communications are usually required between the payment processing provider 140 and the web-based business information system 102 to properly update the accounting data 144 for Carl's Camera after a customer payment transaction has been processed. Inventory adjustment communications between the shopping portal 138 and the web-based business information system 102 would likewise be required to properly update Carl's Camera inventory data 142 after that sale. In direct and/or standards-based cooperation with external parties in control of the external business systems, web-based business information system 102 provides a server-to-server capability for allowing such communications with the external business systems. When communicating the web-based business information system 102 in the context of such server-to-server communications, the external business systems represent a third kind of requesting client to the web-based business information system.

It is to be appreciated that FIG. 1 does not necessarily set forth all of the features of the web-based information system 102 with respect to any one client. Rather, FIG. 1 sets forth certain examples of a web-based information system for purposes of description of one or more the preferred embodiments described infra.

For purposes of clarity of description herein, a client request refers to an internet request according to a stateless internet communication protocol, such as an HTTP request. The client request includes a Uniform or Universal Resource Locator (URL) and parameters, where the term parameters is used to refer to the set of all other information accompanying the URL in the client request and/or to any particular item in the parameters. Thus, for a typical client request such as an HTTP request sent from a browser such as Microsoft Internet Explorer, the term parameters refers to the method identifier (GET, POST, etc.) and, where present, a variety of other accompanying information such as the HTTP version identifier, header(s), cookie(s), language identifiers, time stamps, the body (e.g., for POST methods), and other information as would be readily understood by one skilled in the art. Some of the parameters are often visible on the address line of most browsers (e.g., as a text string separated from the URL by a "?" character), while other parameter are not usually visible on the address line.

As used herein, the term external entry point refers to a URL that, if submitted by a requesting client to a web-based business information system in the absence of a previously established session between the requesting client and the web-based business information system, instantiates some form of login into the web-based business information system for the requesting client. For example, when an end user logs into a web-based business information system provider (e.g., "NetSuite") using a standard system login page that requests their user id and password, an HTTP request may be submitted having an external entry point URL and accompanying parameters [website URL prefix]app/login/nlogin.ns?bob@bobsbikes.com&password=xxxx. As another example, an unaffiliated user such as a web shopper may click on an external link into the web-based business information system having an external entry point URL [website URL prefix]/app/login/alphastore. As yet another example, an external business system may instantiate a server-to-server data exchange by sending an HTTP request having an external entry point URL and accompanying parameters [website URL prefix]/s/smbXML?paccount=ACCT547&data where data is a character string for the business data being communicated according to the smbXML language. The bracketed text "[website URL prefix]" in this paragraph and hereinafter represents a suitable website URL prefix.

In view of the many sophisticated features that can be offered by a web-based business information system, including accommodation of multiple user roles across multiple accounts, accommodation of different business capability combinations for different accounts, different kinds of external access into the web-based business information system using different external access points, and many other features and abilities, problems can arise in upgrading the web-based business information system to a new system version in a manner that satisfies the needs of everyone involved without, at the same time, "breaking" or overloading the system. This can be especially problematic if the upgrade process necessitates the use of a modified database schema for the new version that is not downward compatible with an existing database schema for the current version. Unfortunately, new feature sets and capabilities often implicate modification of the database schema in order to accommodate additional data.

Accordingly, it would be desirable to provide a web-based business information system that can be upgraded in a manner that allows certain accounts to upgrade to a new version as soon as they are ready, while at the same time allowing other accounts to maintain access to the current version.

It would be further desirable to provide such a web-based business information system that concurrently services client requests associated with upgraded accounts and client requests associated with non-upgraded accounts.

It would be still further desirable to provide such a web-based business information system even where the new version comprises a modified database schema that is not downward compatible with an existing database schema for the current version.

It would be even further desirable to provide such a web-based business information system that minimizes any client-side system changes needed for accommodating the upgrade process.

It would be still further desirable to provide such a web-based business information system that is highly scalable and can continue to be upgraded to newer versions in the above ways even as the number of accounts grows very large.

It would be even further desirable to provide such a web-based business information system that accommodates the ability for multiple end users to have multiple roles over one or more accounts and that accommodates multiple external access points.

It would be even further desirable to provide such a web-based business information system that requires no external entry point URL changes by requesting clients to maintain access to the web-based business information system for any particular account therein at any point during the version upgrade process.

It would be even further desirable to provide such a web-based business information system where the upgrade process has modest hardware requirements and network loading implications, such that a provider of a web-based business information system can efficiently operate in an upgrading mode for a percentage of time ranging from many months out of the year to a perpetual upgrading mode.

SUMMARY

A method, system, computer program product, and related business methods are provided in the context of a web-based business information system, wherein successive customer accounts are upgraded to a new version of the web-based business information system from an existing version over a phased rollout period. The web-based business information system is configured such that a URL associated with a particular client request can remain the same even when the corresponding account is upgraded from the current version of the web-based business information system to the new version, and wherein the web-based business information system can service client requests for both upgraded and non-upgraded accounts using a common set of web servers. The web-based business information system is configured to process the client requests using the common set of web servers even where a new database schema for the new version is substantially altered relative to a current database schema for the current version.

According to one preferred embodiment, the web-based business information system comprises a common set of web servers for receiving client requests corresponding to both upgraded and non-upgraded accounts. The web-based business information system further comprises a plurality of application servers including a first set of application servers for processing requests associated with non-upgraded accounts, and including a second set of application servers for processing requests associated with upgraded accounts. The web-based business information system further comprises a plurality of databases including a first group of databases for storing data according to said current database schema for said non-upgraded accounts, and including and a second set of databases for storing data according to said new database schema for said upgraded accounts.

Each web server is configured to determine if a URL of an incoming client request corresponds to an external entry point into the web-based business information system and, if so, to perform login routing for that client request. The login routing process comprises identifying an account corresponding to the client request and routing the client request to one of the first set or second set of application servers according to whether the identified account is a non-upgraded account or an upgraded account, respectively. The web-based business information system comprises a login router database comprising information sufficient to map the entry point URL of the client request and the accompanying parameters into a version identifier identifying whether to route the client request into one of the first or second set of application servers. Login is then performed, if necessary, by the destination application server. If the incoming client request does not correspond to an external entry point, it is forwarded to the first or second set of application servers according to a version cookie or cookie-like data item previously attached to a response during the existing client session.

According to another preferred embodiment, a method of doing business is provided in the context of a phased rollout of a version upgrade in a web-based business information system. During a phased rollout period, early adopter accounts are identified from the base of current version accounts, and early adopter end users are trained by agents of the web-based business information system provider using an offline beta system running the new version. In one preferred embodiment, the early adopters comprise advanced users who have previously requested one or more new features that are in the new version, who have posed challenging advanced questions to support personnel, and/or who have otherwise expressed interest in upgrading earlier rather than later. An early adopter account is switched over to the new version only upon certification by the agents of the web-based business information system provider that their end users are sufficiently qualified. Advantageously, because they are working on live data with real consequences, the early adopters can often identify bugs in the new version not previously identified during beta testing, which can then be corrected before subsequent accounts are switched over. Preferably, the account data for a common set of early adopters is migrated to a common current-version database, and that common set of early adopters are all switched over at the same time in by converting the common database to the new version and updating the login router database of the web-based business information system accordingly.

Advantageously, when implemented in accordance with one or more of the preferred embodiments, a smooth web-based business information system version upgrade process can be achieved that is satisfying to both novice and advanced end users, reasonably manageable for third party server-toserver access administrators, substantially invisible to unaffiliated end users, and that further has modest hardware requirements and network loading implications, such that a provider of a web-based business information system can efficiently operate in an upgrading mode for a large percentage of the time. The preferred embodiments relating to phased rollout are readily extendable to other preferred embodiments in which login routing is used to segregate incoming traffic among different groups of application servers for different criteria, such as class of service criteria, in a URL-agnostic manner.

DETAILED DESCRIPTION

Figure 2:
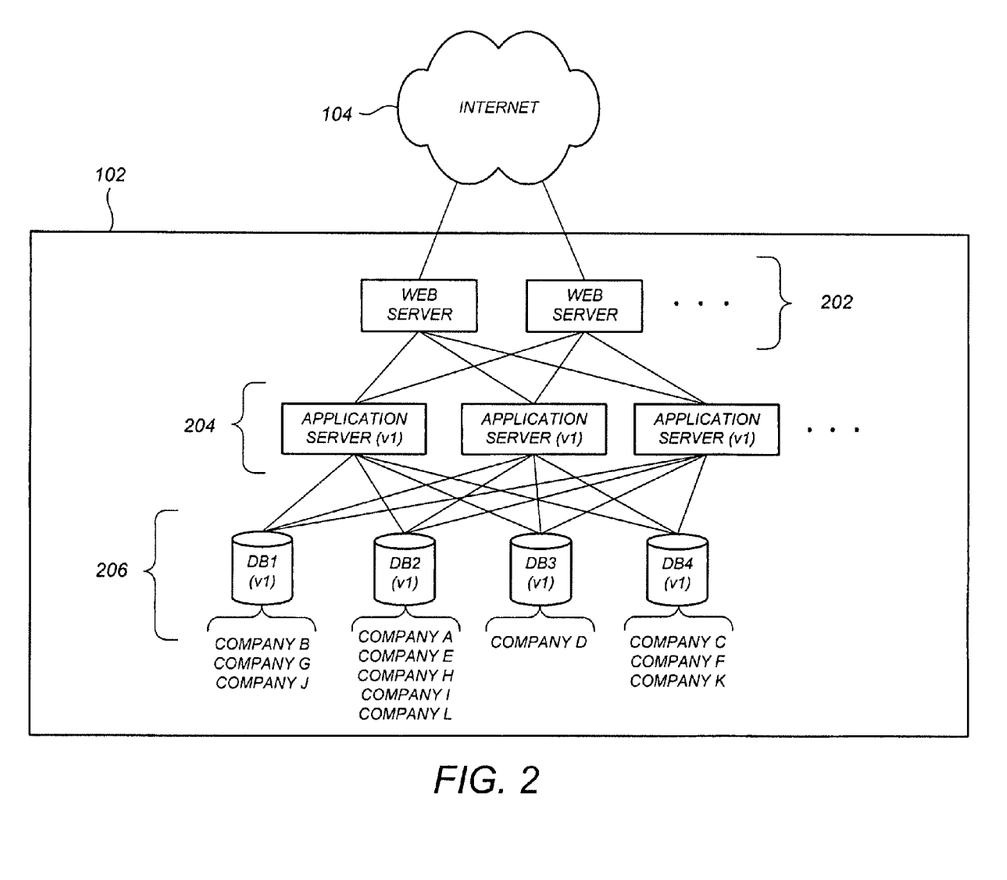
FIG. 2 illustrates a web-based business information system according to a preferred embodiment prior to modification for accommodating a phased rollout.

FIG. 2 illustrates a web-based business information system 102 according to a preferred embodiment prior to modification for accommodating a phased rollout. Web-based business information system 102 comprises a common set 202 of web servers that are substantial duplicates of each other. The web servers can run conventional web server software, such as Apache, Microsoft-IIS, Netscape-Enterprise, Oracle HTTP Server, etc. on conventional operating systems such Linux, Solaris, Unix, HP-UX, FreeBSD, etc. loaded onto conventional web server hardware. Web-based business information system further comprises a plurality of application servers 204 that are also substantial duplicates of each other. Each of the application servers 204 are programmed to serve client requests according to a current version (e.g., v1) of the web-based business information system using, for example, Oracle Application Server Containers for J2EE (OC4J) or other appropriate system.

Web-based business information system further comprises a plurality of databases 206 for storing business information corresponding to subscriber accounts according to a database schema for the current version v1. Preferably, business information for any given account is contained on a single one of the databases 206, although several different accounts can be serviced by a single database, as indicated in FIG. 2.

As known in the art, one difference between the web servers 202 and the application servers 204 is that the web servers 202 are commonly associated with faster, lighter, lower-level processing tasks such as the establishment and tearing down of TCP connections, forwarding of HTTP requests to the application servers, forwarding of HTTP responses from the application servers, etc., in accordance with the overall purpose of Apache, Microsoft-IIS and the like. In contrast, the application servers 204 are commonly associated with more time-intensive tasks such as interpreting client requests, performing database queries and lookups, generating and formatting web page responses to the client requests, etc., in accordance with the overall purpose of OC4J and the like. The web-based business information system 202 represents a so-called three-tiered server architecture, comprising a first tier of web servers, a second tier of application servers, and a third tier of database servers.

It is to be appreciated that the lines in FIG. 2 between the web servers 202 and application servers 204, as well as between the application servers 204 and the databases 206, are only shown to indicate potential data communication pairings among these elements, and do not necessarily represent physical connections among these hardware elements. Rather, as known in the art, in most implementations the various hardware elements are connected via a packet-switched LAN or WAN. It is to be further appreciated that the various hardware components illustrated in FIG. 2 do not need to be located in the same room, the same building, the same city, or even the same continent, provided that they are in networked connectivity to achieve an architecture analogous to that of FIG. 2.

Web-based business information system 102, which in this example is a dedicated third party application service provider, provides services including enterprise resource planning (ERP) and customer relationship management (CRM). In a preferred embodiment similar to NetSuite™, supra, the ERP services include accounting, order processing, time and billing, inventory management, employee management and payroll, calendaring and collaboration, reporting and analysis module, and other ERP-related services. The CRM services include sales force automation (SFA), marketing automation, contact lists, call center support, web-based customer support, reporting and analysis module, and other CRM-related modules. Web-based business information system 102 further provides other business functionalities including web store, payment processing, a partner and vendor management, and integrated reporting. In other preferred embodiments, product lifecycle management (PLM) and software configuration management (SCM) services are also provided. Preferably, these functionalities are seamlessly integrated and executed by a single code base executed on one or more identically programmed application servers that access one or more databases of account data.

It is to be appreciated that the scope of the preferred embodiments is not limited to scenarios in which the web-based business information system 102 is an integration of many different business functionalities. In other preferred embodiments, the web-based business information system 102 may have a single business management functionality, e.g., it may consist only of an SFA system, or only of a vendor management system. In still other preferred embodiments, the web-based business information system 102 may comprise different combinations of these functionalities.

Figure 3:
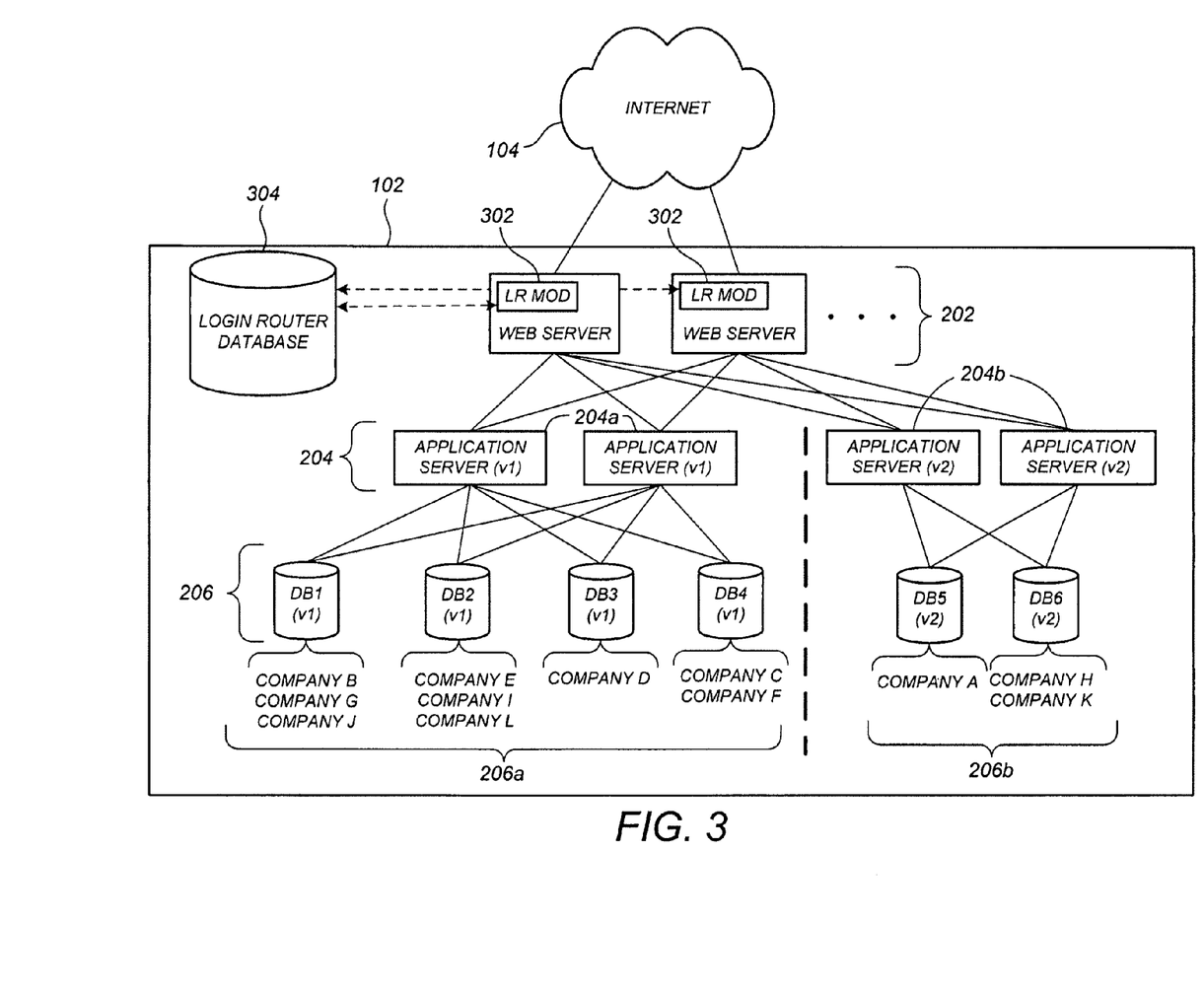
FIG. 3 illustrates a web-based business information system capable of accommodating a phased rollout process according to a preferred embodiment.

FIG. 3 illustrates the web-based business information system 102 as configured to accommodate a phased rollout process according to a preferred embodiment. Each of the common set of web servers has been modified to achieve the functionalities described herein, and includes a login router module 302. In the case of Apache web servers, the modifications including the login router module 302 can be achieved using a set of APIs provided by Apache to allow custom functionalities, resulting in a custom "mod" for the web server. Similar customization APIs are usually provided with most other web server software systems such as Microsoft-IIS.

The application servers 204 of the web-based business information system 102 are now separated into a first set 204a and a second set 204b. The application servers in the first set 204a are substantially identical to each other and remain programmed to run the current version v1 of the web-based business information system. The application servers in the second set 204b are substantially identical to each other and are programmed to run a new version v2 of the web-based business information system. Databases 206 are similarly segregated into a first group 206a storing business information according to the current version v1 database schema and a second group 206b storing business information according to the new version v2 database schema. The database groups 206a and 206b are functionally segregated from each other, and each group is accessed only by their corresponding application servers 204a and 204b. The accounts contained on databases 206b have already been upgraded to the new version, while accounts contained on databases 206a remain on the current version. A login router database 304 is provided that is accessed by the login router module 302 to determine whether to send client requests representing external entry points over to the first set 204a of application servers or to the second set 204b of application servers.

In the preferred embodiment of FIG. 3, the login router database 304 is installed on a server separate from the common set of web servers and accessed across a network. Preferably, a caching scheme is used between the web servers 202 and the login router database 302 to minimize traffic to and from the login router database server for frequently-accessed routing data. Smaller and/or less-frequently changing portions of the login router database are maintained on each web server 202, and the remaining login routing data is maintained on the login router database server 304. The scope of the preferred embodiments is not so limited, however, and in another preferred embodiment, the login router database 304 is replicated onto each of the web servers 202.

Figure 4:
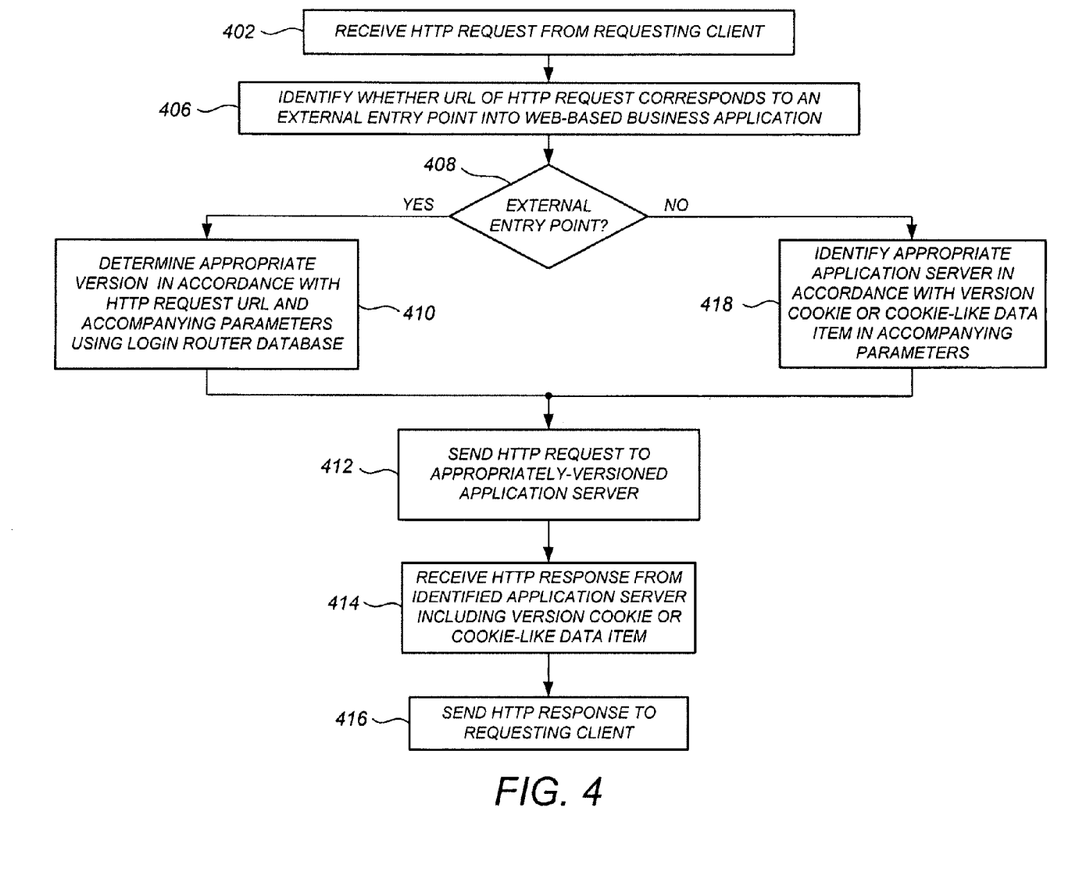
FIG. 4 illustrates a method for processing client requests according to a preferred embodiment.

FIG. 4 illustrates a method for processing client requests in a phased rollout environment according to a preferred embodiment. Client requests are delivered in the form of HTTP requests. For purposes of clarity, the web addresses specified herein are presented as "http" addresses, although it is to be appreciated that "https" addresses are to be inferred wherever the context would implicate security issues. Thus, as used herein, the term HTTP request is to be construed as referring to either standard (port 80) HTTP requests or secure (port 443) HTTPS addresses as necessary. More generally, the term HTTP request may be construed as referring to any stateless interne communication protocol (of which. HTTP is one example) riding over connection-oriented message transfer protocol (of which TCP/IP is one example)

At step 402, an HTTP request is received at one of the common set of web servers 202 from a requesting client. At step 406, it is identified whether a URL of the HTTP request corresponds to an external entry point into the web-based business information system. Stated another way, the web servers trap external entry point URLs. If an external entry point is implicated at step 408, then at step 410 an appropriate version (i.e. current vs. new) is determined in accordance with the HTTP request URL and accompanying parameters using the login router database 304.

Table 1 illustrates an example of external entry point URLs for the web-based business information system that, when hit without a previously established session, will instantiate some form of login according to any of the various capabilities of the web-based business information system. Table 1 also illustrates the relevant accompanying parameters, if any, accompanying the external entry point URLs. It is to be appreciated that Table 1 is presented by way of example only, and not by way of limitation, as there may be many other kinds of external entry points into a web-based business information system depending on the particular services and features being offered.

TABLE 1

| External Entry Point (Description) | Parameters |
|---|---|
| [website URL prefix]/app/login/nslogin.ns (standard end user login) | email, password |
| [website URL prefix]javascript/NSTimeoutPopup.ns (session timeout popup re-login) | NKEY, email, password |
| [website URL prefix]app/login/dashboard.ns (choose role page login) | NKEY, [security hash] |
| [website URL prefix]/app/common/ custom/onlinecusrecordform.ns | ACCOUNT ID |
| [website URL prefix]/app/crm/common/ onlineforms/onlinecrmform.ns | |
| [website URL prefix]/app/crm/common/ nscorp/partnercobrand.ns | |
| [website URL prefix]app/crm/ marketing/campaignlistener.ns | |
| [website URL prefix]/app/crm/ sales/onlineleadform.ns | |
| [website URL prefix]/app/crm/ support/casecreaton.ns | |
| [website URL prefix]/app/crm/ support/onlinecaseform.ns | |
| [website URL prefix]app/site/crm/ externalcasepage.ns | |
| [website URL prefix]app/site/crm/ externalcaseresponsepage.ns | |
| [website URL prefix]/app/site/crm/ externalcustrecordpage.ns | |
| [website URL prefix]/core/help/ admin/glossarydelete.ns | |
| [website URL prefix]/core/help/ admin/glossaryedit.ns | |
| [website URL prefix]/core/help/ admin/taskedit.ns | |
| [website URL prefix]/core/ help/helpimage.ns | |
| [website URL prefix]/core/ help/helppdf.ns | |
| [website URL prefix]/core/ media/media.ns | |
| [website URL prefix]/internal/admin/ qbwdb/blobmedia.ns (external request handler login) | |
| [website URL prefix]/[storealias] (hosted web store login via alias) | none |
| [store domain] (hosted web store login via domain name) | none |
| [website URL prefix]/s/smbXML ("server-to-server" XML exchange) | PARTNER ID, PACCT |

At step 412, the HTTP request is then sent to an appropriately versioned application server, which then performs the login process, if needed, associated with that request. It is to be appreciated that the login routing process, i.e., the routing of the client request to an appropriately versioned application server, is not the same as, and is additional to, any login steps that would actually be performed at the application server level. For example, according to one preferred embodiment, there are no security validations performed in association with the login routing process. Instead, the login routing process represents an additional, preliminary layer that identifies whether the client request would implicate some form of login process in the absence of a previously established session between the requesting client and the web-based business information system. The determination of whether a login is actually going to be performed, and the login process itself including the various security checks (if any), are preferably performed at the application server level, and are preferably not performed at the login routing level.

Thus, for example, where a subscribing user has already logged on and submits [website URL prefix]/app/login/dashboard.ns to change roles, there is no new login process performed at the application server. However, if that subscribing user entered that URL without having previously logged on, the application server would perform a full login process. In both instances, however, there is login routing performed by the web server because an external entry point URL was trapped. In a conventional manner, the application servers use state information contained in the client request to determine how to process it.

Scrupulous population of the login router database allows it to be "thin" as compared to the conventional databases consulted by the application servers in performing their normal duties, which include the actual login process when it occurs. Accordingly, the web servers 202 can still operate very quickly to handle incoming traffic loads, while also facilitating a URL-agnostic phased rollout process according to a preferred embodiment.

It is to be appreciated that, in many cases, the actual login process performed by the application server does not involve a detailed lookup of user name, password, etc. as would be associated with a login from a user of a subscribing account. For example, in the case of unaffiliated users visiting a web store hosted by the web-based business information system, the login process involves little or no security check at all, because web shoppers can be very welcome guests even if their identities are unknown. In cases such as web shoppers, the term login process simply refers to determining whether there is already an existing session with the requesting client, as determined by the presence or absence of session-maintaining information such as cookies and the like, and preparing an HTTP response as appropriate.

At step 414 the web server receives an HTTP response from the application server. A cookie or cookie-like data item containing the system version of the responding application server (e.g., "v1" or "v2" for the example of FIG. 3), termed herein a version cookie or version cookie-like data item, is contained in the HTTP response. As used herein, the term cookie-like data item refers to a component of an HTTP request or response that can be passed back and forth and altered as necessary to maintain a proper session state, or that can otherwise achieve functionalities similar to those of a cookie. In one preferred embodiment, the cookie-like data item can be a visible parameter that could be seen next to the URL on the address line of the client browser, and that is passed back and forth while being modified as necessary. It is to be appreciated that the cookie-like data item can be spread across different parts of the parameters. Furthermore, the cookie-like data item can be expressed in forms other than a "v1" or "v2" declarative, such as in the form of a distributed parameter set from which the proper version can be deduced. At step 416, the HTTP response is sent to the requesting client.

In one preferred embodiment, the version cookie or cookie-like data item is always included in the HTTP response from the application server. In another preferred embodiment, it is only included if an ongoing session is implicated, such as for a standard user login (see Table 1), and is omitted if the client request is known to be associated with a single response.

If at step 408 it is determined that an external entry point is not implicated, i.e., where an external entry point URL has not been trapped, then at step 418 the appropriate application server is identified based on the version cookie or cookie-like data item accompanying the HTTP request. If no version cookie or cookie-like data item is present and no external entry point is implicated, an error response is sent.

Figure 5:
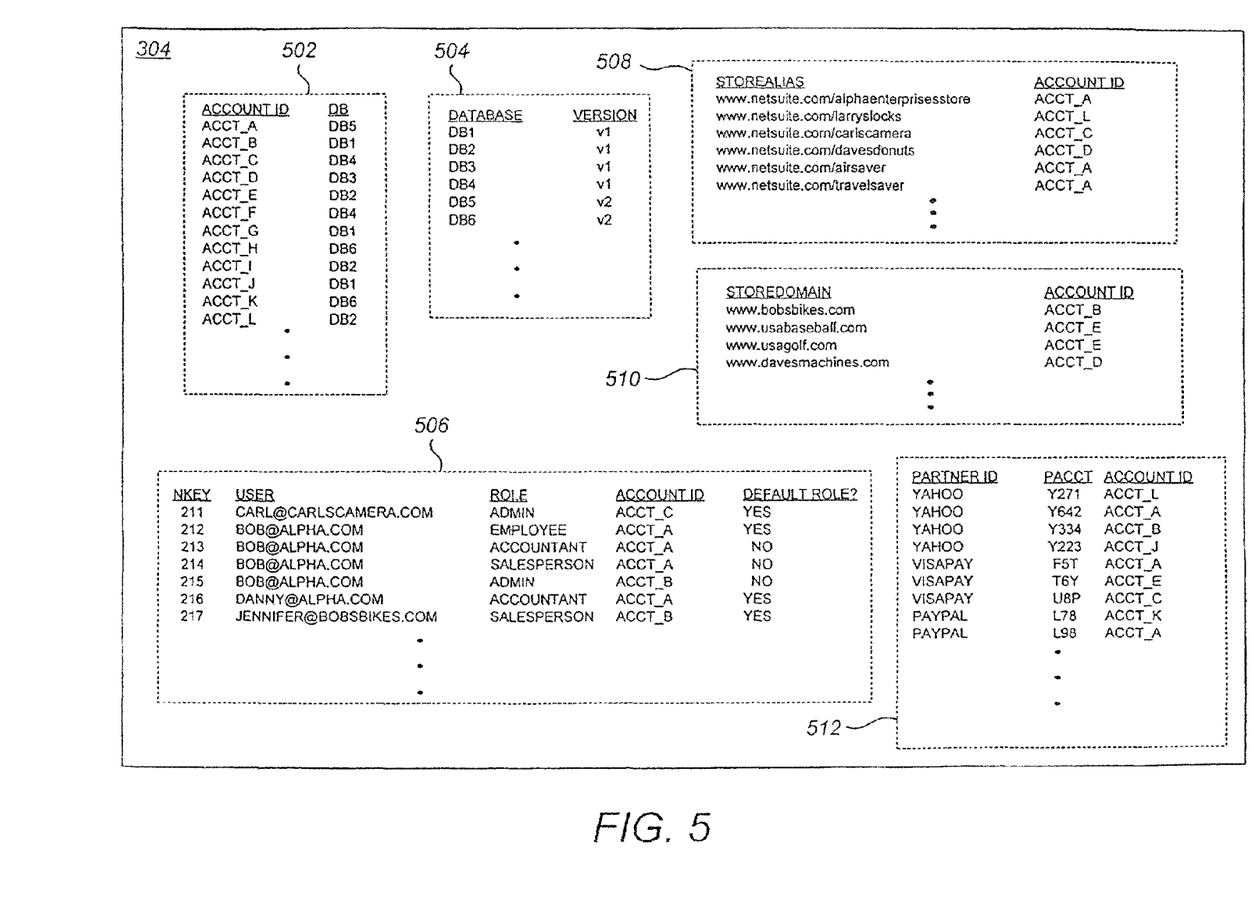
FIG. 5 illustrates a conceptual diagram of a login router database according to a preferred embodiment.

FIG. 5 illustrates a conceptual diagram of information contained in the login router database 304 according to a preferred embodiment. The login router database 304 comprises information sufficient to arrive at a determination, based on the external entry point URL and the accompanying parameters in the HTTP request, if any, of the proper version (current vs. new) of application server to which the HTTP request should be sent. Login router database comprises a first table 502 mapping account IDs into databases, a second table 504 mapping databases into version identifiers, and a third table 506 mapping specific end user IDs into account IDs based on current role. The third table 506 can also map specific end users into account IDs based on an NKEY parameter, which is used in the event that the end user was logged out of their session due to a timeout, and which thereby allows the end user to log back into the system in the same role as when they were timed out.

Login router database 304 further comprises a fourth table 508 mapping store aliases into account IDs directly, without the need for any parameters, as would be necessary for unaffiliated third party user visits to account web stores. Login router database 304 further comprises a fourth table 510 similarly mapping store domains into account IDs directly, without the need for any parameters. Login router 304 further comprises a fifth table 512 mapping third party partner IDs, based a PACCT ID of an account registered with that third party partner, into account IDs, this table being invoked in the context of server-to-server XML exchanges. It is to be appreciated that the login router database structure of FIG. 5 is presented by way of example and not by way of limitation. In view of the present disclosure, one skilled in the art would readily be able to develop tables in a login router database necessary for properly associating an incoming HTTP request with an appropriate application server version, the login router database being highly dependent on the particular features and capabilities of the web-based business information system.

In the preferred embodiment of FIGS. 3 and 5, the login router database 304 is installed on a server separate from the common set of web servers and accessed across a network. It is more preferable, however, to copy smaller and/or less-frequently changing portions of the login router database 304 to each of the web servers 202 for expediting the lookup process. Examples of such smaller and/or more static lookup tables are the store alias lookup table 508 and the store domain lookup table 510. In conjunction therewith, it is also preferable to invoke a caching scheme between the login router database 304 and each web server 202 to further expedite the lookup process.

Advantageously, in any of a variety of circumstances in which external third parties have been using a particular URL and parameter set to interact in a particular way with an account in the web-based business information system, that URL and parameter set does not need to be changed when that account is upgraded to the new version of the web-based business information system. Thus, for example, if an end user of Alpha Enterprises had sent out flyers with a link to their online lead form (e.g., [website URL prefixFapp/crm/sales/onlineleadform.ns?ACCOUNTID=ACCT_A) several months prior to their version upgrade, that link is still good after Alpha Enterprises is upgraded to the new version of the web-based business information system. The practical importance of this advantage is especially evident in the vase of third party server-to-server XML exchanges. For example, an account such as Carl's Camera may separately subscribe to VisaPay for receiving payments, having a VisaPay account of U8P. Months prior to the upgrade of Carl's Camera to the new version of the web-based business information system, VisaPay may have been configured for a server-to-server XML exchange with the web-based business information system to post payments into the accounting data when a transaction has been completed (e.g., [website URL prefixl/s/smbXML?PARTNERID=VISAPAY&PACCT=U8P& . . .), and this does not need to be changed after the upgrade, even though the account data for Carl's Camera may be stored according to an entirely new database schema.

Figure 6:
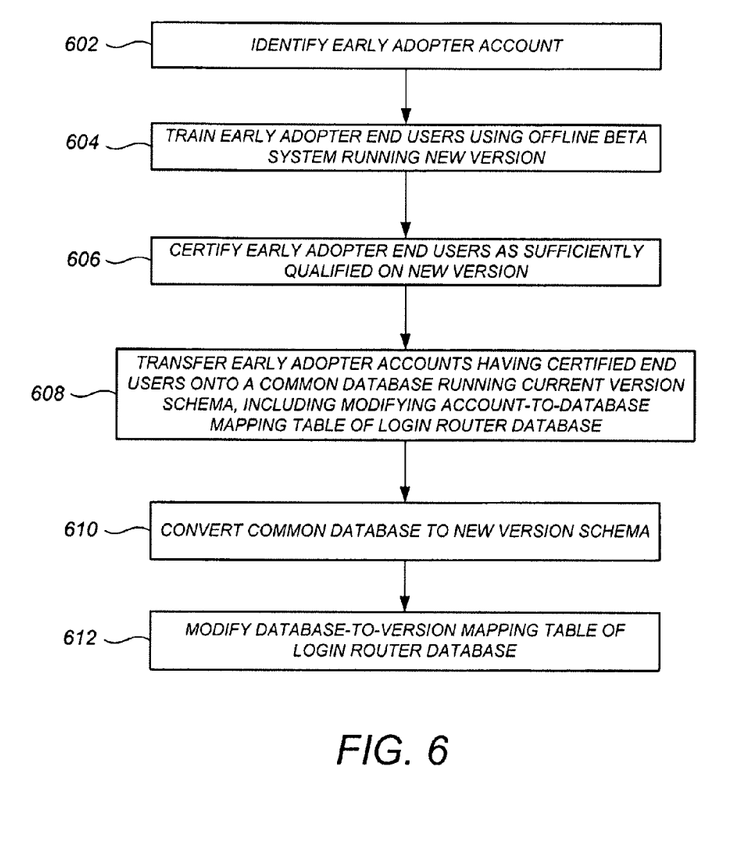
FIG. 6 illustrates an early adopter identification and upgrading process according to a preferred embodiment.

FIG. 6 illustrates an early adopter identification and upgrading process according to a preferred embodiment. During, a phased rollout period, early adopter accounts are identified from the base of current version accounts (step 602), and early adopter end users are trained by agents of the web-based business information system provider using an offline beta system running the new version (step 604). In one preferred embodiment, the early adopters comprise advanced users who have previously requested one or more new features that are in the new version, who have posed challenging advanced questions to support personnel, and/or who have otherwise expressed interest in upgrading earlier rather than later. An early adopter account is switched over to the new version only upon certification (step 606) by the agents of the web-based business information system provider that their end users are sufficiently qualified. Advantageously, because they are working on live data with real consequences, the early adopters can often identify bugs in the new version not previously identified during beta testing, which can then be corrected before subsequent accounts are switched over. Preferably, the account data for a common set of early adopters is migrated to a common current-version database (step 608), and that common set of early adopters are all switched over at the same time in by converting (step 610) the common database to the new version and updating the login router database (step 612) of the web-based business information system accordingly.

Figure 7:
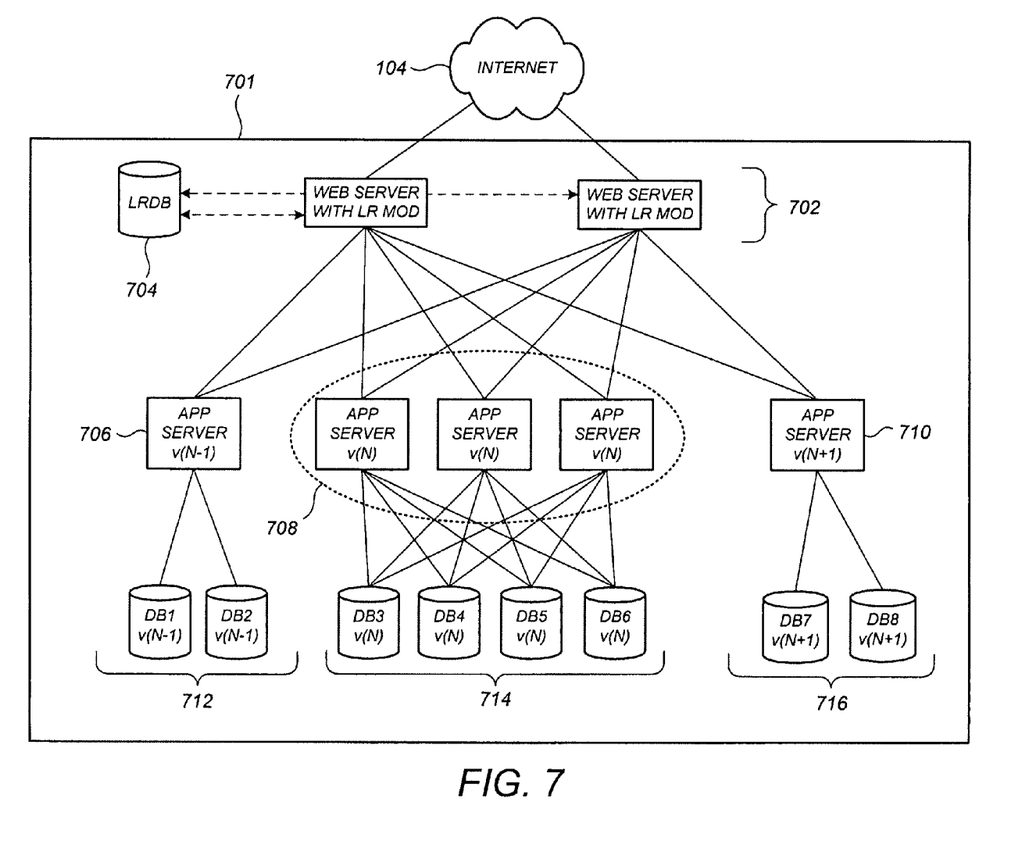
FIG. 7 illustrates a web-based business information system according to a preferred embodiment.

FIG. 7 illustrates a web-based business information system 701 in accordance with another preferred embodiment in which there are three system versions being serviced simultaneously (version "N-1", "N", and "N+1"), respectively. A common set of web servers 702 routes requests among three sets of application servers 706, 708, and 710 based on the contents of a login router database 704. Each set of application servers 706, 708, and 710 are associated with a distinct server group 712, 714, and 716, respectively. The system of FIG. 7 may be used, for example, when there is a particular group of "slowpokes" stuck on version "N-1", a group of conventional users on the current version "N", and a group of advanced users who are using version "N+1". Advantageously, the two-version login router database 3 can be readily modified into a three-version login router database simply by modifying the contents of the table 504 that maps databases into version identifiers. Accordingly, the preferred embodiments are readily extended to include "M" different versions of the system, in which case M sets of application servers are provided, M sets of databases are provided, and M possible conclusions are derived from the login router database.

Figure 8:
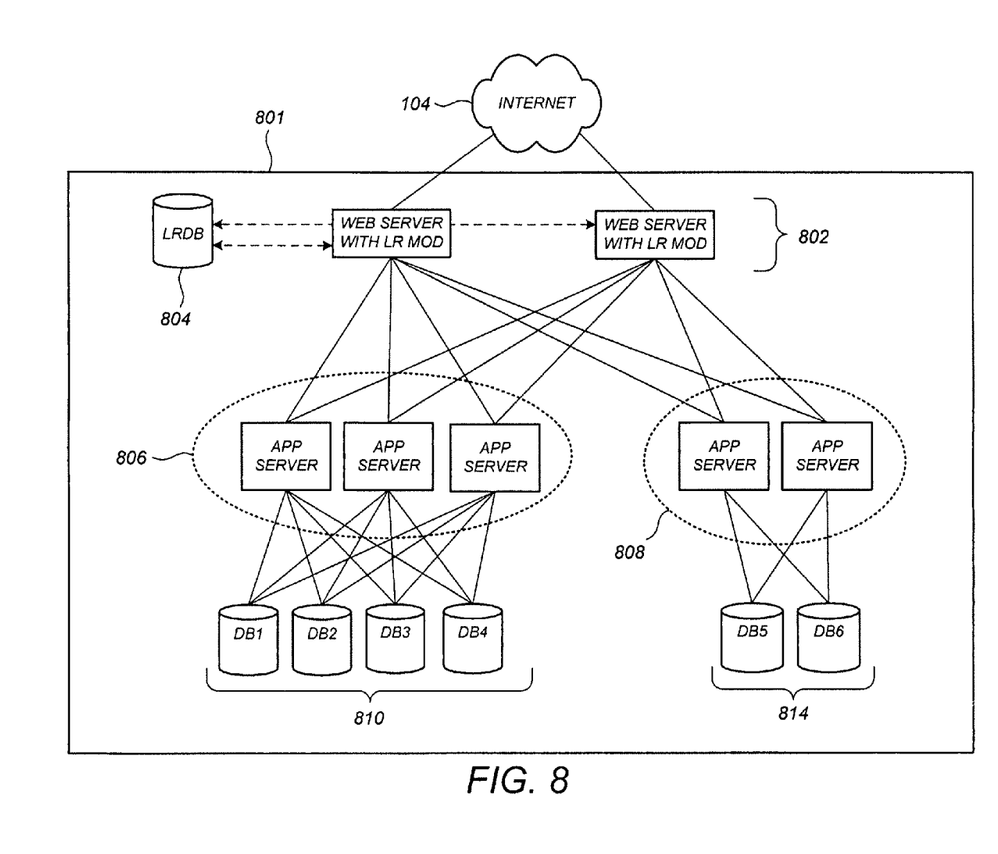
FIG. 8 illustrates a web-based business information system according to a preferred embodiment.

FIG. 8 illustrates a web-based business information system 801 according to a preferred embodiment, in which a login router database 804 is used to route requests based on a class of service rather than a system version by web servers 802. Thus, for example, the bulk of "common" system subscribers would be associated with the set 806 of application servers and set 810 of databases, while a set of "preferred" customers would be associated with a set 808 of application servers and set 814 of databases dedicated only to "preferred" customers. A subscribing customer would, for example, pay extra fees on a monthly basis to keep their status as a preferred customer, or particular "important" accounts can stay on preferred status for no extra charge.

In another preferred embodiment (not shown), where the database schema are identical and the customers are only differentiated by class of service, the databases 810 and 814 can actually be replaced by a common database set that is in communication with all of the application servers. In this case, the login router database would be configured to map client requests into Account ID's, and then to map Account ID's into application server sets, without regard to database assignment. As would be readily understood by one skilled in the art, the preferred methods and systems are readily used to provide any of a variety of combinations of the foregoing capabilities, such as in a system that accommodates different versions as well as different classes of service within each version.

A web-based business information system according to one or more of the preferred embodiments provides advantages where other alternatives may have deficiencies. For example, routing incoming client requests based either a database access by the application server or a "left/right" decision by a user, followed by a 302 redirect, may falter in the case of server-to-server information exchanges or with POST requests. Moreover, such approaches often implicate the construction of two complete virtual web infrastructures, and the associated hardware, software, and maintenance costs.

Whereas many alterations and modifications of the present invention will no doubt become apparent to a person of ordinary skill in the art after having read the foregoing description, it is to be understood that the particular embodiments shown and described by way of illustration are in no way intended to be considered limiting. By way of example, it is to be appreciated that while the examples supra are presented for a multi-functional web-based business information system (i.e., offering multiple services such as web store, ERP, CRM, etc.), the scope of the preferred embodiments is not so limited. Rather, the preferred embodiments are equally applicable to web-based business information systems having only a single functionality, such as a web-based CRM system, a web-based accounting system, and so on, as well as to web-based business information systems providing combinations of two or more of these functionalities.

By way of still further example, it is to be appreciated that there may be intermediate servers located between the common web servers and the application servers, and/or preliminary web servers placed out front of the common web servers relative to the Internet, without necessarily departing from the scope of the preferred embodiments. For example, there may be some preliminary routing, based on other criteria generally unrelated to version upgrade routing, as in the case where a first server farm in Canada is used only to host web stores and therefore to process shopping only, while another server farm in California is used to process only CRM requests, while still another server farm in Ohio is used to process the rest of the account data. In such case, there may be a preliminary web server that routes requests to the different server farms based solely on that web store/CRM/other routing criteria, and then there would be separate groups of common web servers supra placed out in front of each of the different server farms. Alternatively, in another preferred embodiment the web store/CRM/other routing can be performed behind the common web servers supra and in front of separate groups of commonly versioned application servers.

By way of even further example, although described in terms of the use of a login router database to facilitate URL-agnostic version differentiation or class-of-service differentiation, the preferred embodiments are readily extended to include routing based on a variety of different criteria, such as for resource balancing by company (Account ID) or by function (ERP, CRP, etc.) By way of still further example, the term URL as used supra can also, as is common in the art, be construed as referring to the broader class of URIs (Uniform or Universal Resource Identifiers) of which it is a particular type. By way of still further example, the web servers supra can be used to generate HTTP responses on behalf of the application servers, and to extract information from client requests and use a protocol other than HTTP to pass that information to the application servers, without departing from the scope of the preferred embodiments. In an embodiment according to a three-tiered architecture, this can be achieved while still keeping the bulk of the heavy lifting tasks at the application server level. Thus, reference to the details of the preferred embodiments are not intended to limit their scope, which is limited only by the scope of the claims set forth below.

What is claimed is:

1. A computer-implemented method of simultaneously maintaining a plurality of versions of a web-based business information system, comprising:
    identifying a set of subscriber accounts to be migrated from a first of the plurality of versions to a second of the plurality of versions, the first of the plurality of versions associated with a first database schema distinct from a second database schema associated with the second of the plurality of versions;
    migrating data associated with the set of subscriber accounts from the first database schema to the second database schema, the first database schema maintained by a first set of database servers distinct from a second set of database servers maintaining the second database schema; receiving a client request associated with a uniform resource locator and a set of parameters;
    determining that the uniform resource locator matches at least one of a predetermined set of external entry points to the web-based business information system;
    determining that the client request is associated with at least one of the set of migrated subscriber accounts by comparing one or more of the uniform resource locator and the set of parameters associated with the client request to a login router database; and
    forwarding the client request to a set of application servers configured at least to process the client request in accordance with the second database schema; wherein the second database schema is incompatible with the first database schema.

2. A computer-implemented method according to claim 1, wherein:
    the set of subscriber accounts correspond to a set of subscribers of the web-based information system; and
    the client request is received from a user of the web-based information system different from each of the set of subscribers.

3. A computer-implemented method according to claim 1, wherein an intersection of the first database schema with the second database schema is different from the first database schema.

4. A computer-implemented method according to claim 1, wherein the client request specifies at least a portion of the uniform resource locator and the set of parameters.

5. A computer-implemented method according to claim 1, wherein the set of parameters does not include a password.

6. A computer-implemented method according to claim 1, wherein the set of parameters includes an account identifier corresponding to one of the set of subscribers.

7. A computer-implemented method according to claim 1, wherein a type of at least one of the set of parameters is based at least in part on a type of the uniform resource locator.

8. A computer-implemented method of simultaneously maintaining a plurality of versions of a web-based business information system, comprising:
    maintaining a first set of subscriber accounts associated with a first of the plurality of versions and a second set of subscriber accounts associated with a second of the plurality of versions, the first of the plurality of versions corresponding to a first database schema distinct from a second database schema corresponding to the second of the plurality of versions;
    maintaining data associated with the first set of subscriber accounts in accordance with the first database schema and data associated with the second set of subscriber accounts in accordance with the second database schema, the first database schema and the second database schema maintained at least in part by distinct sets of database servers;
    receiving a client request associated with a uniform resource locator and determining that the uniform resource locator matches at least one of a predetermined set of external entry points to the web-based business information system; determining that the client request is associated with at least one database schema corresponding to at least one of the plurality of versions by comparing data associated with the client request to a login router database; and
    forwarding the client request to a set of application servers configured at least to process the client request in accordance with the at least one database schema corresponding to the at least one of the plurality of versions; wherein the second database schema is incompatible with the first database schema.

9. A computer-implemented method according to claim 8, wherein the client request specifies at least a set of parameters and the determination that the client request is associated with the at least one database schema is based at least in part on the specified set of parameters.

10. A computer-implemented method according to claim 8, wherein:
    maintaining the first and second sets of subscriber accounts comprises identifying at least a subset of the first set of subscriber accounts to be migrated to the second of the plurality of versions; and
    maintaining data associated with the first and second set of subscriber accounts comprises migrating data associated with the identified subset of the first set of subscriber accounts from the first database schema to the second database schema.

11. A computer-implemented method according to claim 10, wherein the first database schema is maintained by a first of the distinct sets of database servers and the second database schema is maintained by a second of the distinct sets of database servers.

12. A computer-implemented method according to claim 8, wherein the first set of subscriber accounts and the second set of subscriber accounts correspond to different subsets of the predetermined set of external entry points.

13. One or more non-transitory computer readable media collectively having thereon computer executable instructions that when executed cause one or more computers to collectively, at least:

maintain a first set of user accounts associated with a first of a plurality of versions of a web-based business information system and a second set of user accounts associated with a second of the plurality of versions of the web-based business information system, the first of the plurality of versions corresponding to a first data schema distinct from a second data schema corresponding to the second of the plurality of versions;

maintaining data associated with the first set of user accounts in accordance with the first data schema and data associated with the second set of subscriber accounts in accordance with the second data schema, the first data schema and the second data schema maintained at least in part by distinct sets of database servers;

receiving a client request at one or more of a set of web servers common to the first and the second of the plurality of versions of the web-based business information system and determining that the client request is associated with at least one data schema corresponding to at least one of the plurality of versions by comparing data associated with the client request to a login router database; and forwarding the client request to at least one of a set of application servers configured at least to process the client request in accordance with the determined at least one data schema corresponding to the at least one of the plurality of versions; wherein the second database schema is incompatible with the first database schema.

14. One or more non-transitory computer readable media according to claim 13, wherein the computer executable instructions further cause the one or more computers to collectively, at least, migrate one or more user accounts in the first set of user accounts to the second set of user accounts at least in part by migrating data in accordance with the first data schema to be in accordance with the second data schema.

15. One or more non-transitory computer readable media according to claim 13, wherein the second data schema supports web-based business information system functionality that is unsupported by the first data schema.

16. One or more non-transitory computer readable media according to claim 13, wherein determining that the client request is associated with the at least one data schema comprises determining that the at least one data schema is compatible with the client request.

17. One or more non-transitory computer readable media according to claim 13, wherein determining that the client request is associated with the at least one data schema comprises:

determining that the client request is associated with a uniform resource locator;

determining that the uniform resource locator matches at least one of a predetermined set of external entry points to the web-based business information system; and determining the at least one data schema based at least in part on the uniform resource locator.

18. One or more non-transitory computer readable media according to claim 13, wherein determining that the client request is associated with the at least one data schema comprises:

determining that the client request is associated with a uniform resource locator and a set of parameters;

determining that the uniform resource locator matches at least one of a predetermined set of external entry points to the web-based business information system; and determining the at least one data schema based at least in part on one or more of the uniform resource locator and the set of parameters.

19. One or more non-transitory computer readable media according to claim 13, wherein determining that the client request is associated with the at least one data schema comprises determining that the client request is associated with a cookie-like data item and determining the at least one data schema based at least in part on the cookie-like data item.

* * * * *